(12) United States Patent
Yamamoto et al.

(10) Patent No.: US 7,594,255 B2
(45) Date of Patent: Sep. 22, 2009

(54) TELEVISION RECEIVER AND DISPLAY CONTROL METHOD THEREOF

(75) Inventors: Takashi Yamamoto, Yamato (JP); Tomoyuki Ohno, Zama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 11/459,707

(22) Filed: Jul. 25, 2006

(65) Prior Publication Data

US 2007/0028287 A1 Feb. 1, 2007

(30) Foreign Application Priority Data

Jul. 26, 2005 (JP) ............................. 2005-215980

(51) Int. Cl.
*G06F 13/00* (2006.01)
*H04N 7/173* (2006.01)
*H04N 7/16* (2006.01)
*G06F 3/00* (2006.01)

(52) U.S. Cl. ........................ 725/153; 725/151; 725/133; 725/110; 725/44; 725/43; 725/45; 715/730; 715/716; 715/732

(58) Field of Classification Search ........................ None
See application file for complete search history.

(56) References Cited

U.S. PATENT DOCUMENTS

| 7,062,712 B2 * | 6/2006 | Schneider et al. ............ 715/721 |
| 7,480,701 B2 * | 1/2009 | Smith et al. .................. 709/217 |
| 2005/0033758 A1 * | 2/2005 | Baxter ......................... 707/100 |
| 2005/0047752 A1 * | 3/2005 | Wood et al. .................... 386/83 |
| 2005/0231648 A1 * | 10/2005 | Kitamura et al. ............ 348/734 |
| 2005/0240964 A1 * | 10/2005 | Barrett ........................ 725/44 |
| 2006/0037054 A1 * | 2/2006 | McDowell et al. ............ 725/80 |
| 2006/0123455 A1 * | 6/2006 | Pai et al. ..................... 725/133 |
| 2006/0129941 A1 * | 6/2006 | Hollemans .................. 715/740 |
| 2006/0156352 A1 * | 7/2006 | Smith et al. .................. 725/86 |
| 2006/0184966 A1 * | 8/2006 | Hunleth et al. ............... 725/39 |
| 2008/0184118 A1 * | 7/2008 | Yun et al. .................... 715/719 |

FOREIGN PATENT DOCUMENTS

JP 2002-218331 8/2002

* cited by examiner

*Primary Examiner*—Joseph P Hirl
*Assistant Examiner*—Jun Fei Zhong
(74) *Attorney, Agent, or Firm*—Canon U.S.A., Inc., IP Division

(57) ABSTRACT

A television receiver which allows a user to view at least an image of a broadcast program, includes a first display unit adapted to display a video of a broadcast program upon selection of a first channel, a second display unit adapted to display a slide show that switches and displays images included in a first image group designated from image groups including a plurality of still images or moving images upon selection of a second channel, and an operation unit adapted to execute at least two channel selection operations including a direct channel selection as an operation for directly selecting the first channel and the second channel, and a sequential channel selection as an operation for sequentially selecting the channels, and a display mode of the slide show by the second display unit is varied in correspondence with the channel selection operation of the channel made upon starting the slide show.

5 Claims, 23 Drawing Sheets

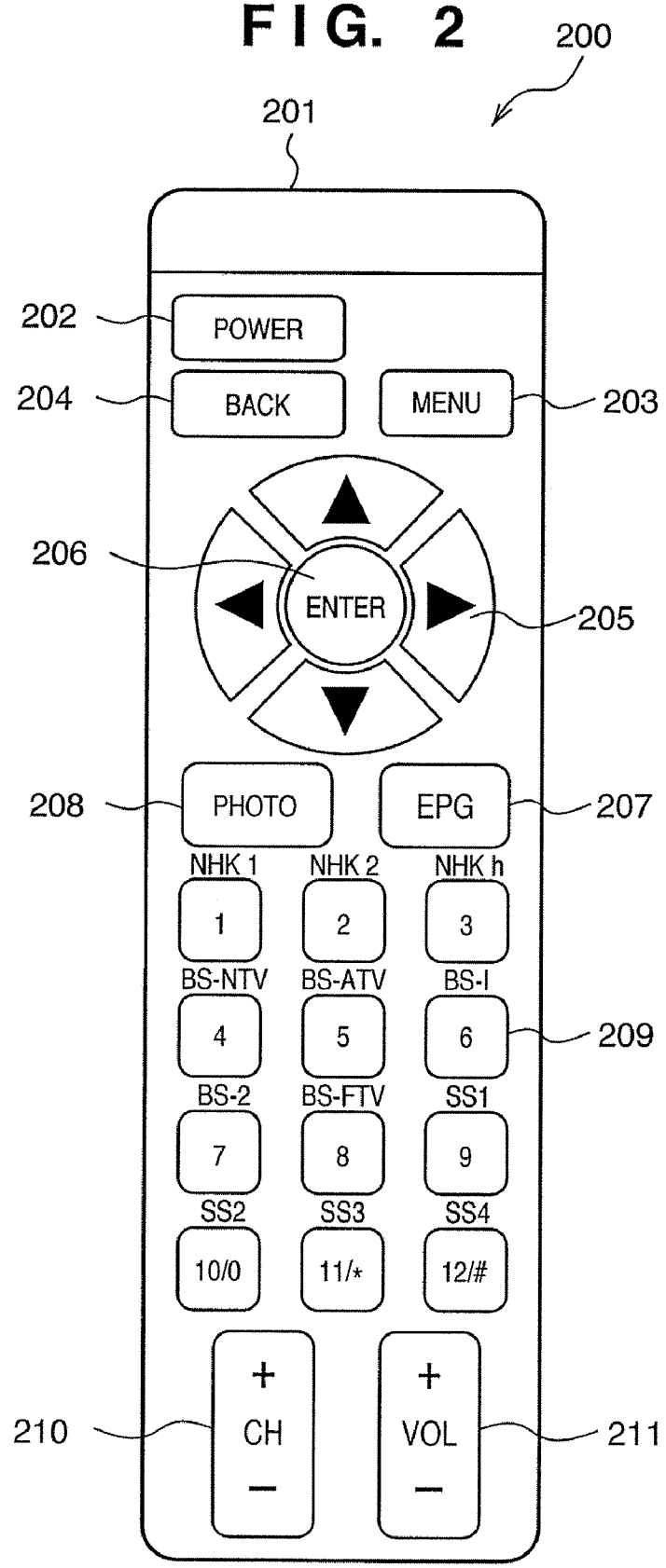

FIG. 3

| CH | TYPE | CHANNEL SELECTION INFORMATION |
|---|---|---|
| 1 | TV | (NHK 1 CHANNEL SELECTION INFORMATION) |
| 2 | TV | (NHK 2 CHANNEL SELECTION INFORMATION) |
| 3 | TV | (NHK h CHANNEL SELECTION INFORMATION) |
| 4 | TV | (BS NTV CHANNEL SELECTION INFORMATION) |
| 5 | TV | (BS ATV CHANNEL SELECTION INFORMATION) |
| 6 | TV | (BS-I CHANNEL SELECTION INFORMATION) |
| 7 | TV | (BS-J CHANNEL SELECTION INFORMATION) |
| 8 | TV | (BS FTV CHANNEL SELECTION INFORMATION) |
| 9 | NONE | |
| 10 | NONE | |
| 11 | NONE | |
| 12 | NONE | |

FIG. 7
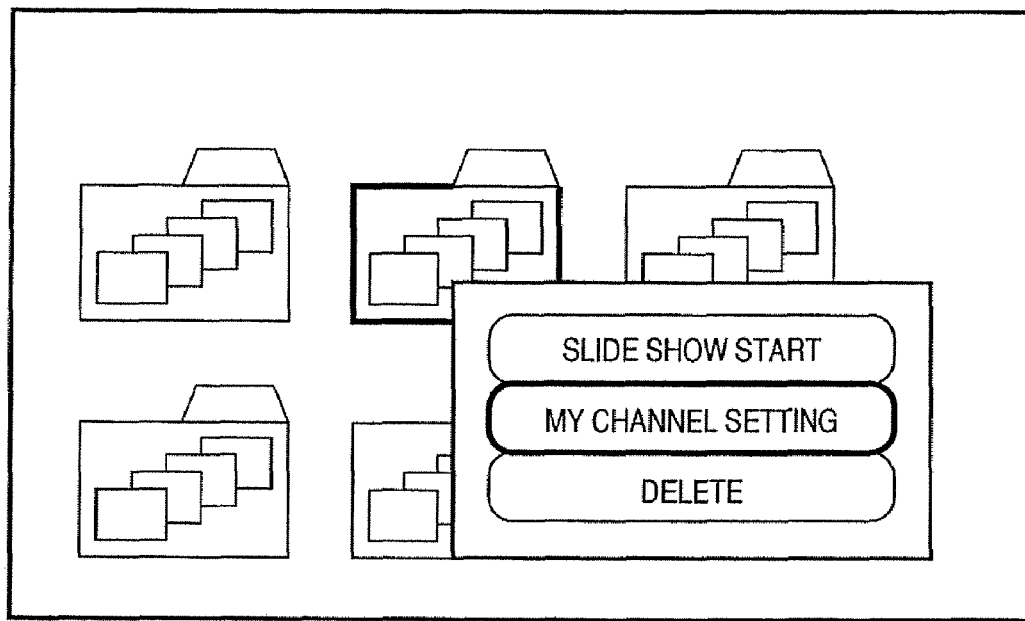
<S7-1>
(ENTER OPERATION)
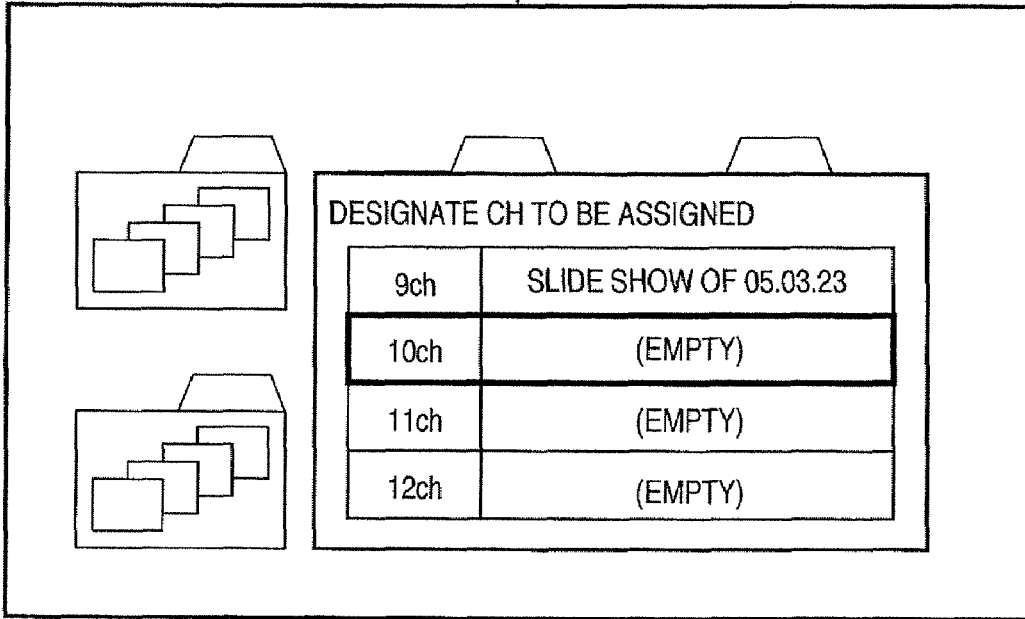
<S7-2>

FIG. 8A

| CH | TYPE | CHANNEL SELECTION INFORMATION |
|---|---|---|
| 1 | TV | (NHK 1 CHANNEL SELECTION INFORMATION) |
| 2 | TV | (NHK 2 CHANNEL SELECTION INFORMATION) |
| 3 | TV | (NHK h CHANNEL SELECTION INFORMATION) |
| 4 | TV | (BS NTV CHANNEL SELECTION INFORMATION) |
| 5 | TV | (BS-ATV CHANNEL SELECTION INFORMATION) |
| 6 | TV | (BS-I CHANNEL SELECTION INFORMATION) |
| 7 | TV | (BS-J CHANNEL SELECTION INFORMATION) |
| 8 | TV | (BS FTV CHANNEL SELECTION INFORMATION) |
| 9 | PHOTO | (05.03.23 START INFORMATION) |
| 10 | NONE | |
| 11 | NONE | |
| 12 | NONE | |

FIG. 8B

| CH | TYPE | CHANNEL SELECTION INFORMATION |
|---|---|---|
| 1 | TV | (NHK 1 CHANNEL SELECTION INFORMATION) |
| 2 | TV | (NHK 2 CHANNEL SELECTION INFORMATION) |
| 3 | TV | (NHK h CHANNEL SELECTION INFORMATION) |
| 4 | TV | (BS NTV CHANNEL SELECTION INFORMATION) |
| 5 | TV | (BS ATV CHANNEL SELECTION INFORMATION) |
| 6 | TV | (BS-I CHANNEL SELECTION INFORMATION) |
| 7 | TV | (BS-J CHANNEL SELECTION INFORMATION) |
| 8 | TV | (BS FTV CHANNEL SELECTION INFORMATION) |
| 9 | PHOTO | (05.03.23 START INFORMATION) |
| 10 | PHOTO | (05.04.20 START INFORMATION) |
| 11 | NONE | |
| 12 | NONE | |

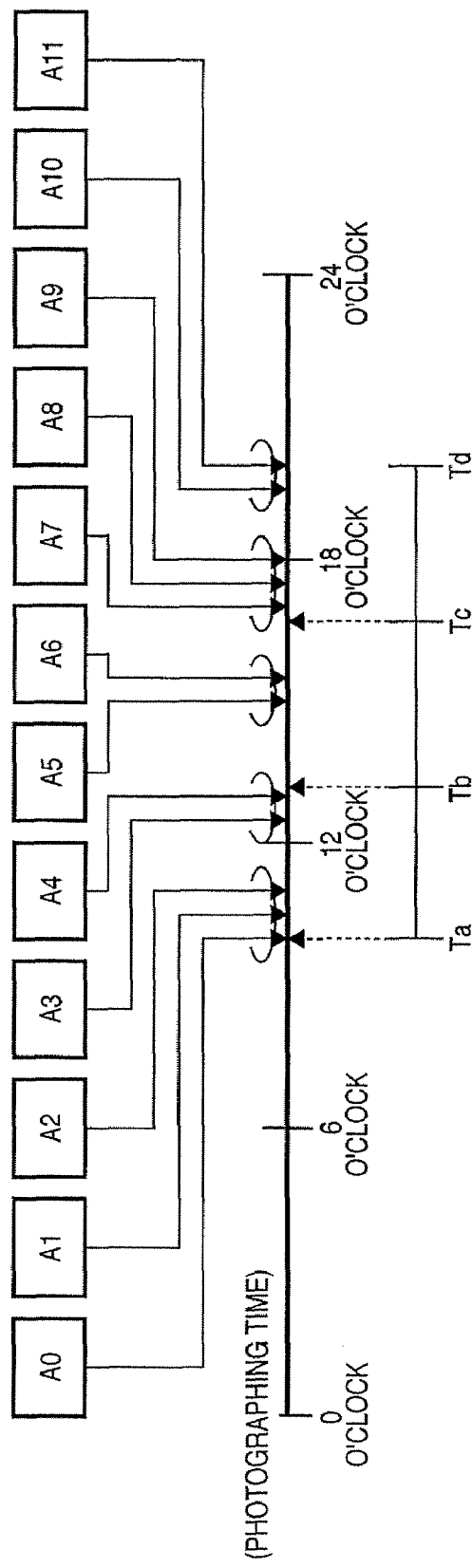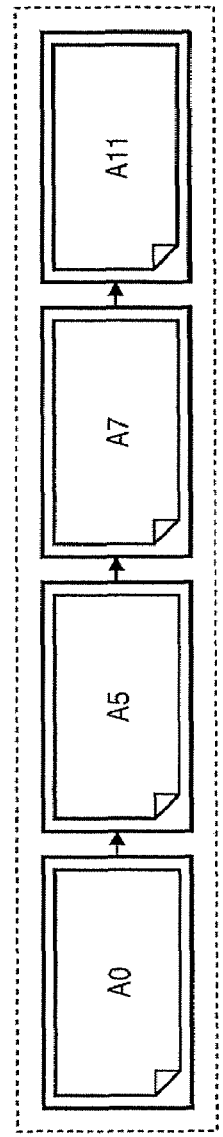

F I G. 11
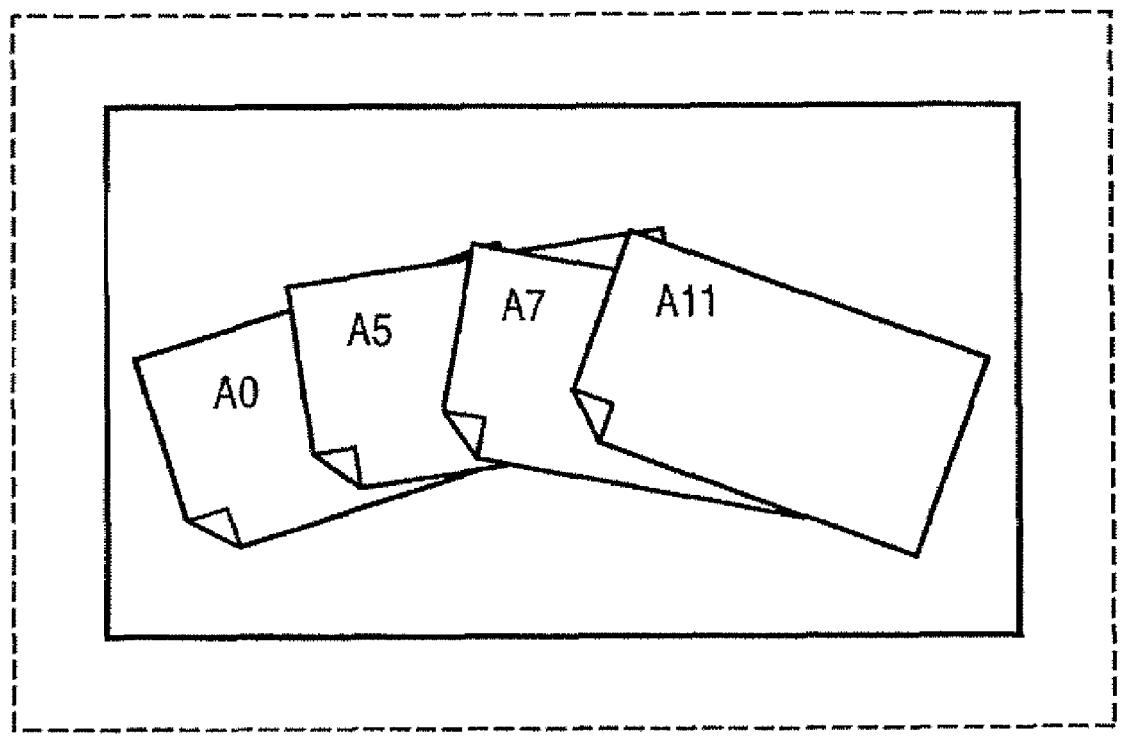

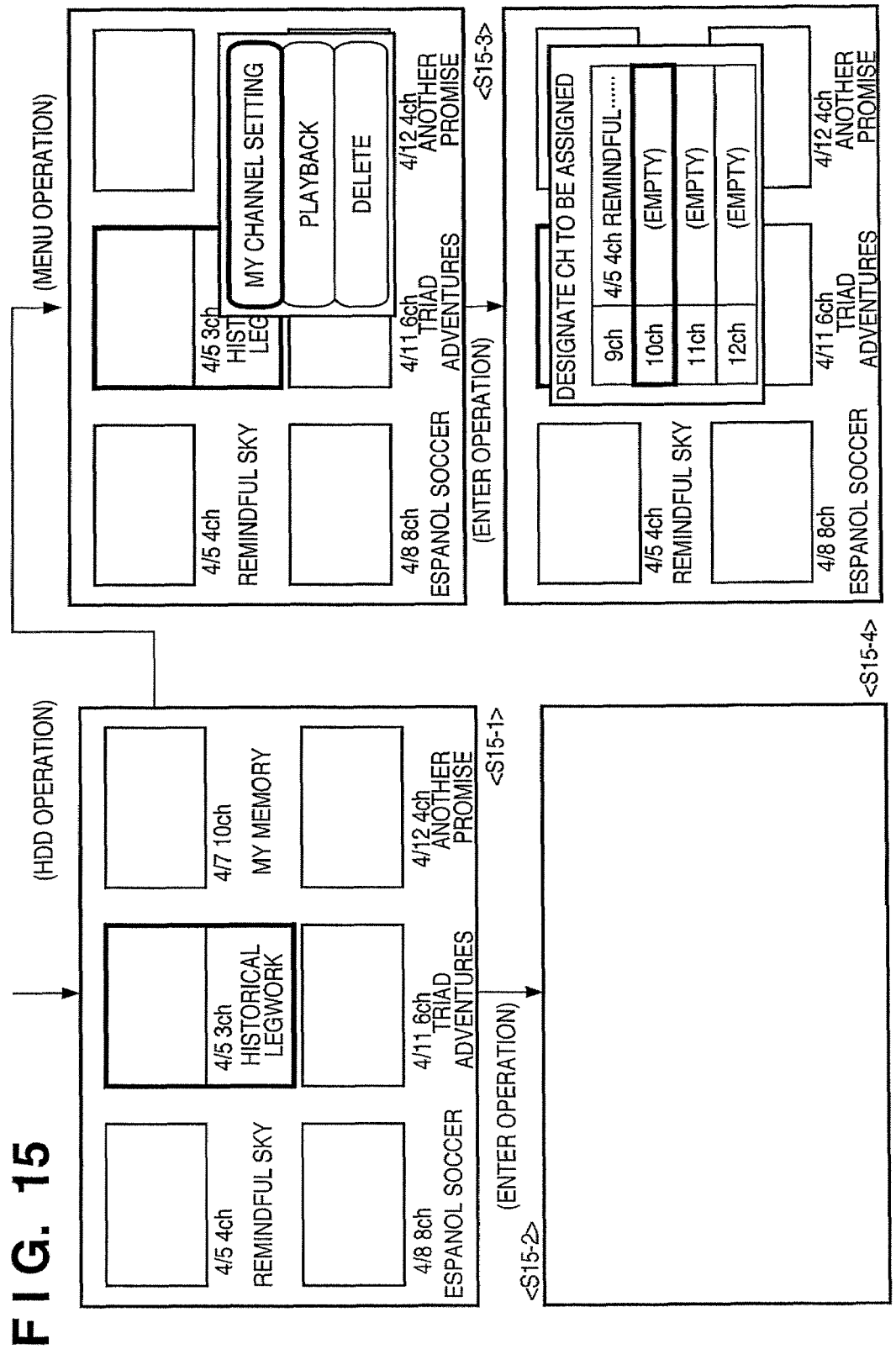

FIG. 16A

| CH | TYPE | CHANNEL SELECTION INFORMATION |
|---|---|---|
| 1 | TV | (NHK 1 CHANNEL SELECTION INFORMATION) |
| 2 | TV | (NHK 2 CHANNEL SELECTION INFORMATION) |
| 3 | TV | (NHK h CHANNEL SELECTION INFORMATION) |
| 4 | TV | (BS NTV CHANNEL SELECTION INFORMATION) |
| 5 | TV | (BS ATV CHANNEL SELECTION INFORMATION) |
| 6 | TV | (BS-I CHANNEL SELECTION INFORMATION) |
| 7 | TV | (BS-J CHANNEL SELECTION INFORMATION) |
| 8 | TV | (BS FTV CHANNEL SELECTION INFORMATION) |
| 9 | HDD | (4/5 4ch START INFORMATION) |
| 10 | NONE | |
| 11 | NONE | |
| 12 | NONE | |

FIG. 16B

| CH | TYPE | CHANNEL SELECTION INFORMATION |
|---|---|---|
| 1 | TV | (NHK 1 CHANNEL SELECTION INFORMATION) |
| 2 | TV | (NHK 2 CHANNEL SELECTION INFORMATION) |
| 3 | TV | (NHK h CHANNEL SELECTION INFORMATION) |
| 4 | TV | (BS NTV CHANNEL SELECTION INFORMATION) |
| 5 | TV | (BS ATV CHANNEL SELECTION INFORMATION) |
| 6 | TV | (BS-I CHANNEL SELECTION INFORMATION) |
| 7 | TV | (BS-J CHANNEL SELECTION INFORMATION) |
| 8 | TV | (BS FTV CHANNEL SELECTION INFORMATION) |
| 9 | HDD | (4/5 4ch START INFORMATION) |
| 10 | HDD | (4/5 3ch START INFORMATION) |
| 11 | NONE | |
| 12 | NONE | |

F I G. 17B
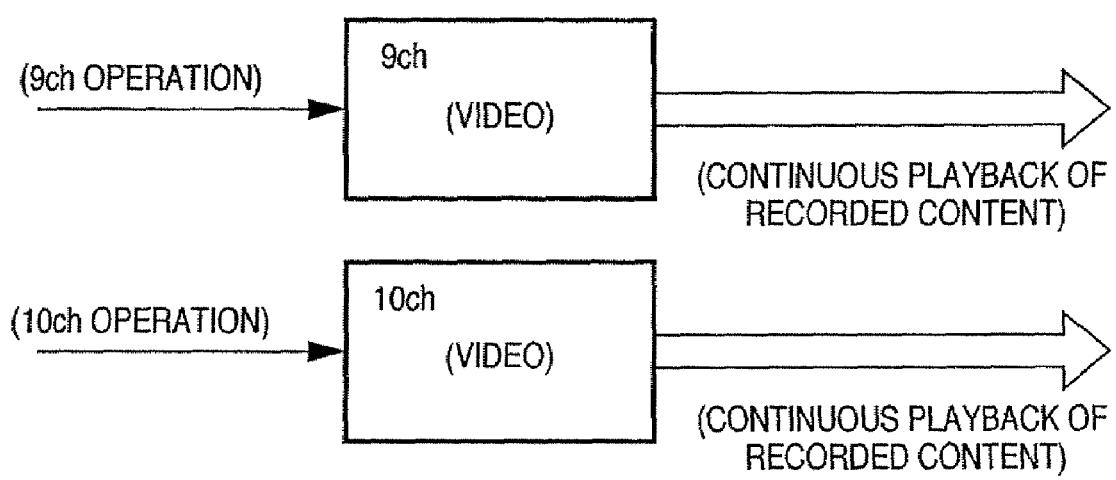

TELEVISION RECEIVER AND DISPLAY CONTROL METHOD THEREOF

FIELD OF THE INVENTION

The present invention relates to a television receiver which allows the user to view broadcast programs, and images and contents other than the broadcast programs, and a display control method thereof.

BACKGROUND OF THE INVENTION

Digital televisions (TVs) comprising wide-screen, high-image quality displays have prevailed. In addition to viewing of high-image quality broadcast programs by digital TV broadcast, and viewing of additional information services by data broadcast, the needs for viewing still images which are sensed by digital cameras and are output onto paper media so far upon appreciation on the wide-screen of a digital TV are increasing.

Still images sensed by a digital camera are sent to a digital TV via an information storage medium such as a memory card or the like, and are displayed on the display screen of a digital TV via an image display function of the digital TV. The viewing method of image data includes two modes, i.e., a mode of viewing individual image data by user's operations, and a mode of displaying image data which belong to a designated group under the TV control, i.e., a slide show mode.

As a simple method of starting a slide show by designating an image data group, one of TV channels is assigned to start viewing of a slide show by the same operation as channel selection of TV broadcast (for example, Japanese Patent Laid-Open No. 2002-218331).

When designation of an image data group which is to undergo a slide show is assigned to one of TV channels, and the slide show is started by channel selection, there are two operation methods as in the conventional TV channel selection methods. One method is direct channel selection for selecting a channel by operating a channel button to select the assigned channel, and the other method is sequential channel selection for switching a channel in turn to the neighboring channel in the order of channel numbers.

Normally, since the channel numbers of TV channels correspond to specific broadcast stations, the user who makes the direct channel selection of a specific channel selects a channel for the purpose of viewing a broadcast program. Likewise, when a slide show is to be started by direct channel selection, the user operates a channel button to which designation of an image data group is assigned for the purpose of starting the slide show.

On the other hand, the sequential channel selection is an operation for sequentially switching channels arranged in advance based on channel numbers or the like, and determining by viewing the displayed video if a broadcast program that the user wants is displayed. When the channel that starts a slide show is selected during such operation, the user feels something is wrong unlike a case wherein he or she makes the sequential channel selection in a sequence of only broadcast channels. That is, since a video of a broadcast program displayed in a broadcast channel is a moving image, and its display contents change in a short period of time, the user can receive information that allows him or her to recognize the contents of the broadcast program. By contrast, since the slide show is configured based on still image display, the information which can be obtained in a short period of time is considerably smaller than the video of the broadcast program, and the user cannot easily recognize the type of an image data group, the slide show of which is to start. When the user cannot determine based on the first image at the beginning of the slide show if a target image data group is selected, he or she must wait until the current image is switched to at least the next image while the still image that provides no more information is kept displayed.

For this reason, when a channel for starting a slide show is set among broadcast channels, the user has considerably different experiences in the sequential channel selection between a channel which displays a broadcast program and that which displays a slide show. Also, so-called zapping for seeking a channel that makes target display while sequentially switching channels cannot be smoothly made.

SUMMARY OF THE INVENTION

In order to solve the aforementioned problems, a television receiver according to the present invention is a television receiver which allows a user to view at least an image of a broadcast program, comprising: a first display unit adapted to display a video of a broadcast program upon selection of a first channel; a second display unit adapted to display a slide show that switches and displays images included in a first image group designated from image groups including a plurality of still images or moving images upon selection of a second channel; and an operation unit adapted to execute at least two channel selection operations including a direct channel selection as an operation for directly selecting the first channel and the second channel, and a sequential channel selection as an operation for sequentially selecting the channels, wherein a display mode of the slide show by the second display unit is varied in correspondence with the channel selection operation of the channel made upon starting the slide show.

A television receiver according to the present invention is a television receiver which allows a user to view at least an image of a broadcast program, comprising: a first display unit adapted to display a video of a television broadcast program upon selection of a first operation section; a second display unit adapted to display one content designated from a plurality of contents upon selection of a second operation section; an operation unit adapted to execute at least two channel selection operations including a direct channel selection as an operation for directly selecting the first operation section and the second operation section, and a sequential channel selection as an operation for sequentially selecting the operation sections, wherein a display mode of the content by the second display unit is varied in correspondence with the channel selection operation of the operation section selected to display the content.

A display control method for a television receiver according to the present invention is a display control method for a television receiver which allows a user to view at least an image of a broadcast program, comprising: a first display step of displaying a video of a broadcast program upon selection of a first channel; a second display step of displaying a slide show that switches and displays images included in a first image group designated from image groups including a plurality of still images or moving images upon selection of a second channel; and an operation step of executing a channel selection operation as one of a direct channel selection as an operation for directly selecting the first channel and the second channel, and a sequential channel selection as an operation for sequentially selecting the channels, wherein a display mode of the slide show in the second display step is varied in correspondence with the channel selection operation of the channel made upon starting the slide show.

A display control method for a television receiver according to the present invention is a display control method for a television receiver which allows a user to view at least an image of a broadcast program, comprising: a first display step of displaying a video of a television broadcast program upon selection of a first operation section; a second display step of displaying one content designated from a plurality of contents upon selection of a second operation section; and an operation step of executing a channel selection operation as one of a direct channel selection as an operation for directly selecting the first operation section and the second operation section, and a sequential channel selection as an operation for sequentially selecting the operation sections, wherein a display mode of the content in the second display step is varied in correspondence with the channel selection operation of the operation section selected to display the content.

According to the present invention, since the user can recognize the contents of the slide show and content with the same sense as the broadcast programs, zapping in the mixed state of the slide show or content playback and the broadcast program can be naturally performed.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 shows an outer appearance of a remote controller of the first embodiment;

FIG. 3 shows the configuration of a channel selection table;

FIG. 7 shows screen display examples upon making a slide show start setting and channel setting;

FIGS. 8A and 8B show the configurations of channel selection tables including the slide show start settings;

FIGS. 10A and 10B are views for explaining the preview playback operations upon displaying a slide show;

FIG. 11 is a view for explaining the preview playback operation upon displaying a slide show;

FIG. 15 shows input operations and screen display operations upon viewing a recorded content;

FIGS. 16A and 16B show the configurations of channel selection tables including a playback start setting of a recorded content; and FIGS. 17A to 17C show screen display operations of a recorded content playback which is launched by channel selection.

DETAILED DESCRIPTION OF THE PREFERRED EMBODIMENTS

The best mode for carrying out the present invention will be described in detail hereinafter with reference to the accompanying drawings.

Note that embodiments to be described hereinafter are examples as implementation means of the present invention, and should be modified or changed as needed depending on the arrangements and various conditions of apparatuses to which the present invention is applied. Therefore, the present invention is not limited to the embodiments to be described hereinafter.

First Embodiment

The first embodiment according to the present invention will be described below.

(Arrangement of Digital TV)

Figure 1:
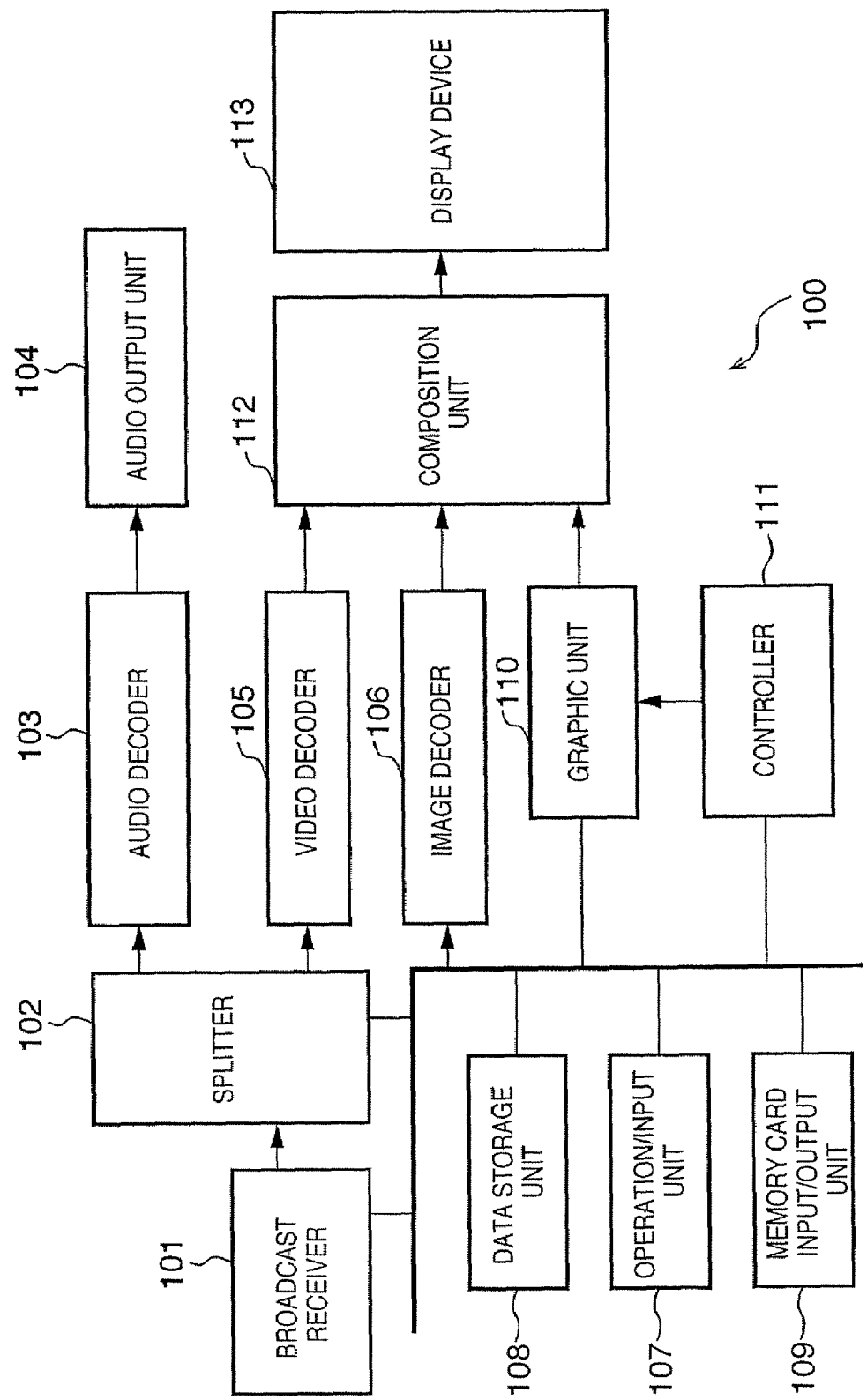
FIG. 1 is a block diagram showing the arrangement of a digital TV according to the first embodiment of the present invention.

FIG. 1 is a block diagram showing the arrangement of a digital TV 100 according to the first embodiment of the present invention.

Referring to FIG. 1, reference numeral 101 denotes a broadcast receiver which receives broadcast signals from a reception antenna of digital broadcast and CATV broadcast signals (not shown). The broadcast receiver 101 selects a predetermined transmission channel from the received signals under the control of a controller 111 (to be described later), demodulates the received data of the received transmission channel, and outputs a TS signal.

Reference numeral 102 denotes a splitter which extracts program sequence information from the TS signal, and outputs it to the controller 111 (to be described later), and splits the TS signal into a target video signal, audio signal, and data broadcast data under the control of the controller 111. The audio signal is decoded by an audio decoder 103, and is output as an audio from an audio output unit 104 including a D/A converter. The video signal is decoded by a video decoder 105, and is displayed on a display device 113 via a composition unit 112. Devices which can form the display device 113 are, for example, flat-panel displays having a matrix electrode structure such as a liquid crystal display, plasma display, and the like, a CRT including a cathode ray tube, and so forth. The data broadcast signal split by the splitter 102 is stored in a data storage unit 108, and is read out by the controller 111 upon viewing data broadcast.

Reference numeral 107 denotes an operation/input unit which receives user operations by means of operation switches which are provided on a receiver of a remote controller that utilizes an infrared ray signal or those which are directly provided to a digital TV 100, and sends them to the controller 111. The controller 111 controls a graphic unit 110 based on the user's input operation received from the operation/input unit 107, the program sequence information received from the splitter 102, or the data broadcast data read out from the data storage unit 108. With this control, the graphic unit 110 generates a graphic signal to be presented to the user. The generated graphic signal is sent to the composition unit 112, and is composited with the video signal decoded by the video decoder 105 and a still image signal decoded by an image decoder 106 (to be described later) as needed, thus displaying the composite signal on the display device 113. The digital TV 100 allows the user to view a target broadcast program by receiving digital broadcast based on user operations under the systematic control of the controller 111 of the aforementioned components.

Reference numeral 109 denotes a memory card input/output unit which connects a detachable memory card that stores image data based on still images or moving images sensed by a digital camera (not shown), and inputs or outputs image file data which includes the sensed image data, and additional information such as photographing date & time information and the like. The digital TV 100 stores data read from the memory card as an image file in the data storage unit 108. The controller 111 displays a graphical user interface on the display device 113 via the graphic unit 110 based on pre-stored programs. The controller 111 reads out the image file stored in the data storage unit 108 in accordance with a user operation input via the operation/input unit 107, and sends image data to the image decoder 106.

The image decoder 106 decodes according to the data format of image data, and the decoded image data is displayed on the display device 113 after it is composited to graphic data for operations by the composition unit 112.

The digital TV 100 of this embodiment allows the user to view images sensed by a digital camera based on user operations under the systematic control of the controller 111 for the aforementioned components.

FIG. 2 shows an outer appearance of a remote controller 200 which transmits a user operation result to the operation/input unit 107 of the digital TV 100 as an infrared ray signal.

The remote controller 200 comprises a power button 202 used to turn on/off the power supply of the digital TV 100, a menu button 203 used to launch a menu, and a back button 204 used to return the operation state of the digital TV to an immediately preceding state. Also, the remote controller 200 comprises four arrow buttons 205 used to instruct a movement of a focus on a screen operation in one of up, down, right, and left directions, and an enter button 206 used to instruct determination of selection of a display element at the focus position on the screen operation. Furthermore, the remote controller 200 comprises an EPG button 207 used to launch an electronic program guide, a photo button 208 used to launch image viewing based on image files stored in the digital TV 100, and 12 channel buttons 209 used to directly select a broadcast program to be watched. Moreover, the remote controller 200 comprises channel up and down buttons 210 used to sequentially select a broadcast program to be watched in the up or down direction, and tone volume up and down buttons 211 used to instruct an increase or decrease in audio tone volume. In addition, the remote controller 200 comprises an infrared signal output unit 201 which outputs the user operation result of each of these operation buttons as an infrared ray signal. The infrared ray signal output from the infrared signal output unit 201 is received by the operation/input unit 107 of the digital TV 100, and is supplied to the controller 111 and is used to control the digital TV 100, as described above.

The digital TV 100 comprises operation switches and the like equivalent to the remote controller 200 or corresponding to some operation buttons as the operation/input unit 107 in addition to those equipped on the remote controller 200. However, a description thereof will be omitted for the sake of simplicity.

The user operations via the remote controller 200 will be described below. However, operations by means of the operation switches of the operation/input unit 107, or other means including communications can be made in the same manner as those using the remote controller 200.

(Broadcast Channel Selection Method)

Upon broadcast viewing, direct channel selection that directly designates a specific channel, and sequential channel selection that designates channels arranged in a predetermined order in turn are available.

In the direct channel selection, the user selects a target channel and starts viewing of a broadcast program by pressing one of the channel buttons 209 equipped on the remote controller 200. FIG. 3 shows a channel selection table which is stored in the data storage unit 108 and is referred to by the controller 111. The channel selection table stores type and selection information for each of channel buttons 209 from 1 to 12. As the type, one of data corresponding to "TV", "photo", and "none" is stored, and "TV" means that TV viewing is made via the corresponding channel. The channel selection information is control information required to start broadcast viewing of the corresponding channel, and includes information for broadcast channel selection to be instructed to the broadcast receiver 101, a video signal to be instructed to the splitter 102, information for split designation of an audio signal, and the like.

Upon reception of information indicating that the user has pressed one of the channel buttons 209 via the operation/input unit 107, the controller 111 refers to a column of the channel selection table corresponding to the pressed channel button 209. When the corresponding column stores the type="TV" as a result of reference, the controller 111 performs channel selection control according to the channel selection information. That is, a video of a broadcast program specified by the designated channel is displayed on the display device 113, and an audio is output from the audio output unit 104.

Figure 4A:
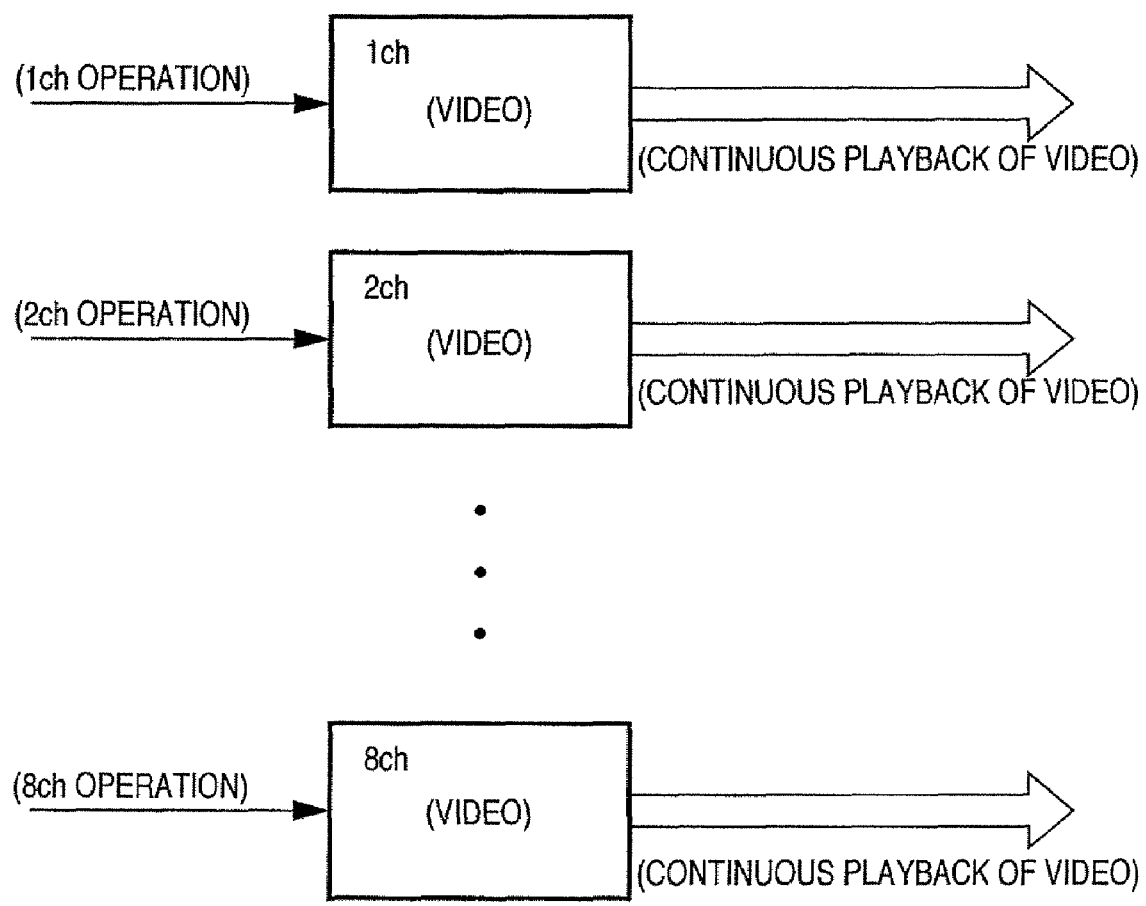
FIGS. 4A and 4B show screen display operations in channel selection operations.

FIG. 4A illustrates a video display state by the direct channel selection, and illustrates that a video of a broadcast program of the designated channel begins to be displayed by a specific channel designation operation.

In the sequential channel selection, the user sequentially switches a channel of a broadcast program to be watched to the one which neighbors the currently viewed channel by pressing the channel up or down button 210 equipped on the remote controller 200. Upon reception of information indicating that the user has pressed the channel up button 210 via the operation/input unit 107, the controller 111 refers to a column of a channel which neighbors on the larger channel number side of the currently viewed channel in the channel selection table. If the type of that channel is "TV", the controller 111 makes channel selection according to its channel selection information. For example, in the channel selection table shown in FIG. 3, when the currently viewed channel is 8ch and the type corresponding to the next channel is "none", the controller 111 refers to the next column in turn. When the channel number exceeds 12ch as the last column of the channel selection table, the controller 111 uses 1ch as the next channel by returning to the first column of the table, and executes the same channel selection control.

When the user presses the channel down button 210, the controller 111 uses a channel which neighbors the currently viewed channel on the smaller channel number side as the next channel. When the channel number exceeds 1ch as the first column of the channel selection table, the controller 111 refers to the next column in turn from the last one of the table, and when a column which stores the type="TV" is reached, the controller 111 performs channel selection control.

Figure 4B:
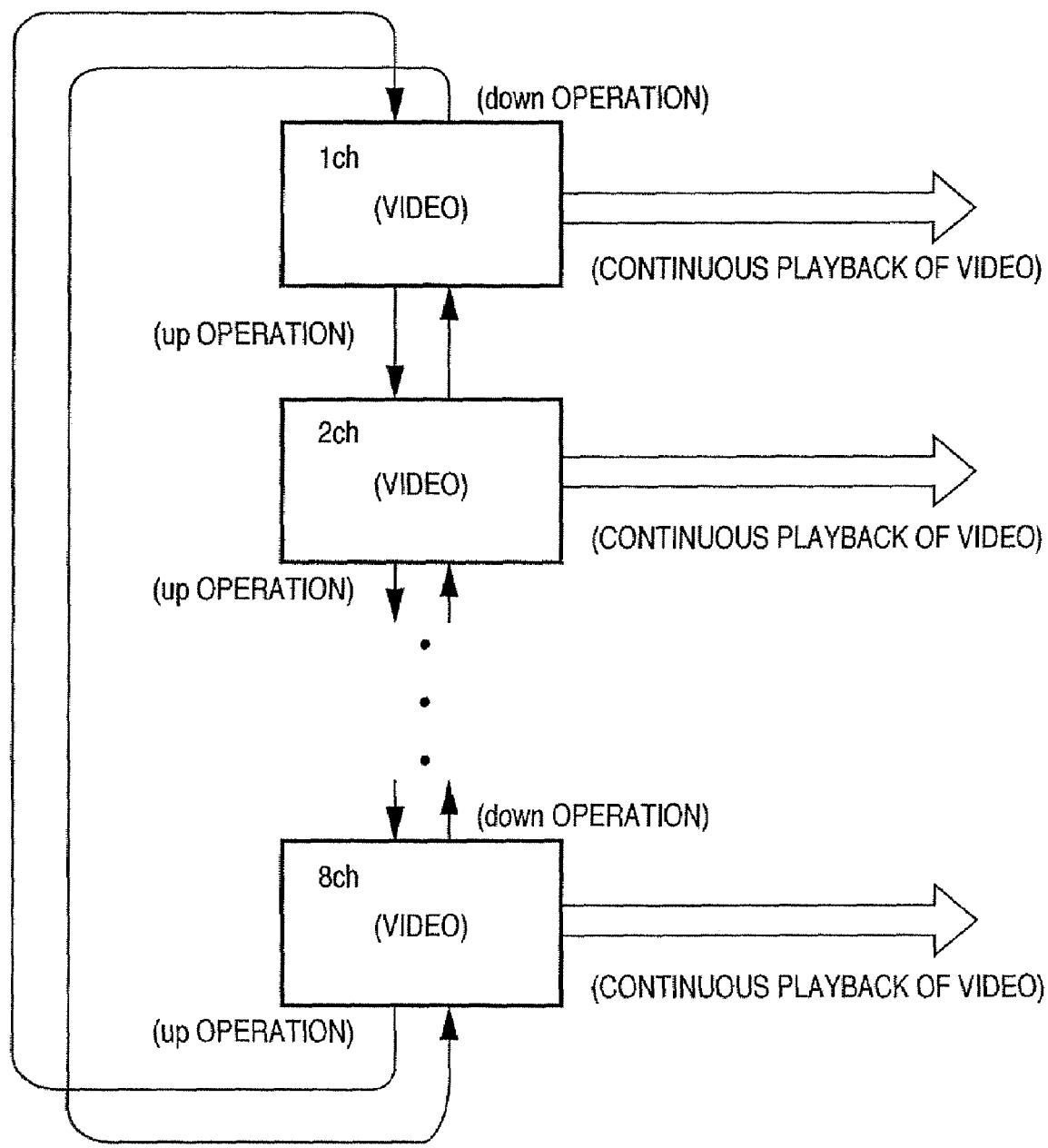

FIG. 4B illustrates a video display state in the sequential channel selection, and illustrates that a video of a broadcast program of the neighboring channel begins to be displayed upon operation of the channel up or down button 210.

(Designation of Image Viewing Content, and Start Operation of Slide Show)

Viewing of image data is started by the photo button 208 on the remote controller 200. The controller 111 receives information indicating that the user has pressed the photo button 208 via the operation/input unit 107. The controller 111 displays a graphical user interface based on the pre-stored program, reads out an image file stored in the data storage unit 108 according to the subsequent user operations, and displays a graphic frame on the display device 113.

Figure 5:
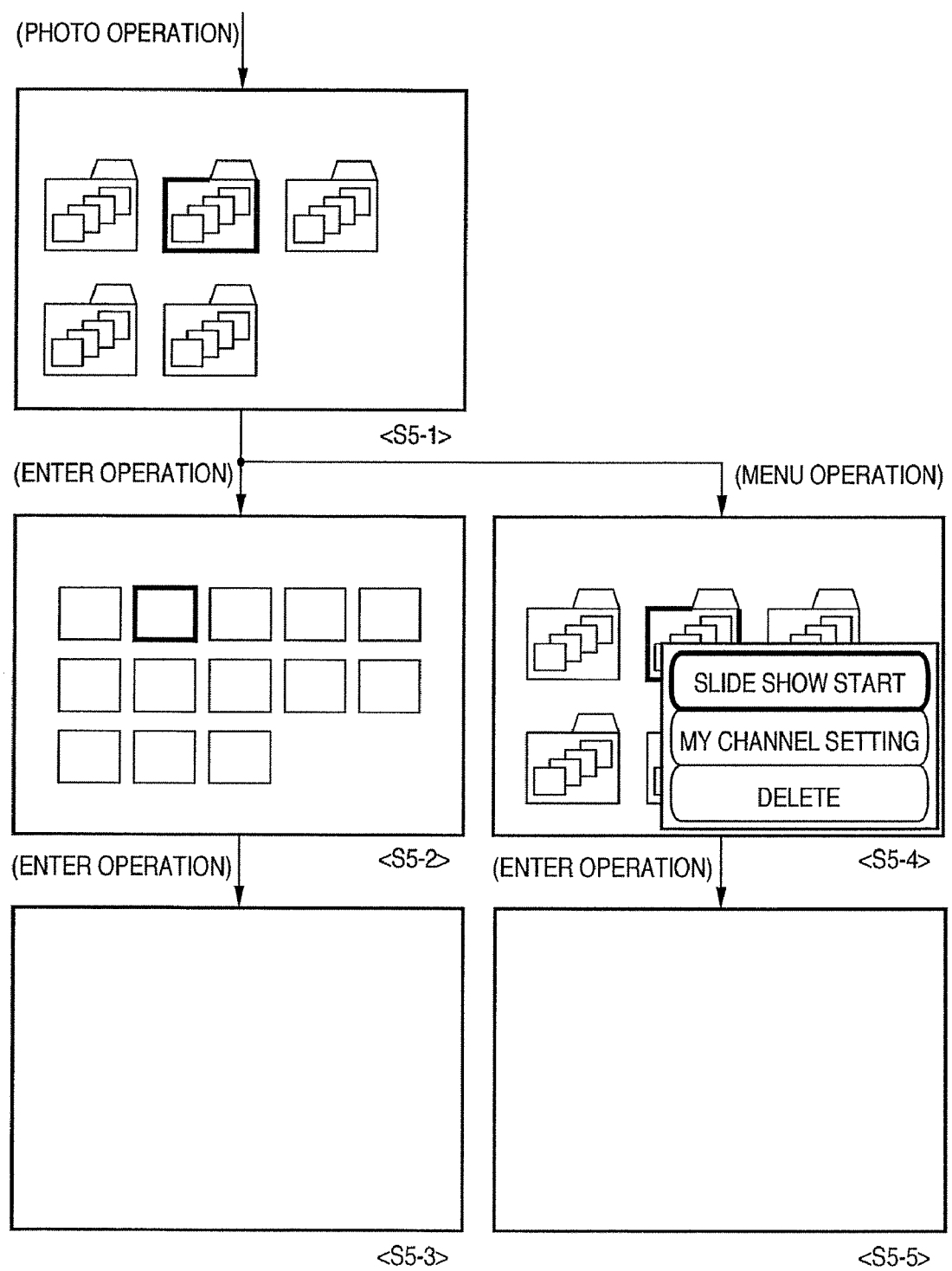
FIG. 5 shows input operations and screen display operations upon viewing image data.

FIG. 5 illustrates input operations and display operations upon viewing image data.

During, e.g., viewing of a broadcast program, the viewing state transits to a folder display state S5-1 as a state presenting the full picture of stored image data groups upon pressing of the photo button 208. The image data groups are classified into those for respective photographing dates, and each group is displayed as one folder. A frame indicating a focus is displayed on one of displayed folders to indicate a folder to be manipulated. The focus can move to the upper, lower, right, or left neighboring folder by the arrow buttons 205 on the remote controller 200. The user can select a folder to be watched by moving the focus.

The folder display state S5-1 transits to a list display state S5-2 upon pressing of the enter button 206. In the list display state S5-2, thumbnails of image data are displayed as a list of image data which belong to an image data group selected by the focus, and a frame indicating the focus is displayed on one of these thumbnails. The user can select image data to be watched by moving the focus using the arrow buttons 205 on the remote controller 200, and can make the list display state transit to a single display state S5-3 by pressing the enter button 206.

In the single display state S5-3, the image data selected by the focus is displayed on the full display screen, and the user can view a target sensed image. Furthermore, in the single display state S5-3, the display state can sequentially transit to other image data which belong to the same folder, i.e., the image data group with the identical photographing date by pressing the right or left arrow button 205 on the remote controller 200.

The folder display state S5-1 transits to a menu display state S5-4 upon pressing of the menu button 203 on the remote controller 200, and an operation for the focused image data group can be selected. As shown in FIG. 5, in the menu display state S5-4, one of operations "slide show start", "my channel setting", and "delete" of an image data group can be selected by moving the displayed focus.

Figure 6:
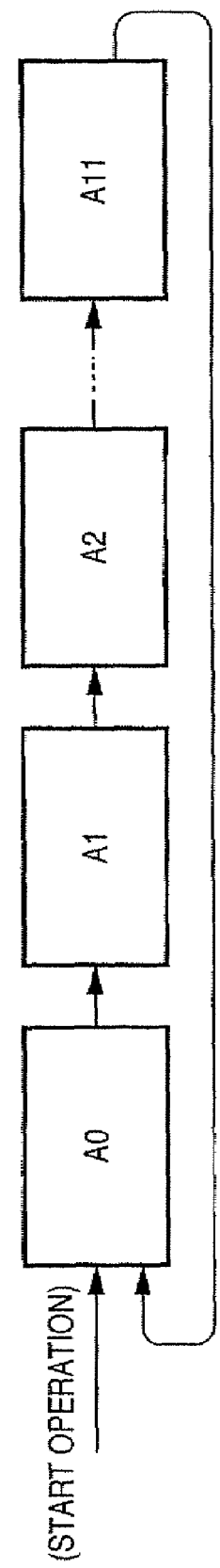
FIG. 6 shows screen display operations upon displaying a slide show.

In the menu display state S5-4, when the user presses the enter button 206 on the remote controller 200 while "slide show start" is focused, the display state transits to a slide show display state S5-5. In the slide show display state S5-5, image data which belong to the image data group to be watched are automatically displayed in turn in the single display state. FIG. 6 illustrates the operations in the slide show display state. FIG. 6 shows that the single display state of 12 image data A0, A1, A2, . . . , A11 which belong to image data group A is switched in turn at predetermined time intervals (e.g., 5 sec), and image data A0 is displayed again after image data A11.

(My Channel Setting and Direct Channel Selection)

Start of a slide show of a specific image data group can be set in one of the channel buttons 209 on the remote controller 200 as "my channel".

FIG. 7 illustrates the display screen upon operation for setting start of a slide show in one of the channel buttons 209.

When the user presses the enter button 206 on the remote controller 200 in a state S7-1 in which he or she moves the focus on the my channel setting item by the up or down arrow button 205 on the remote controller 111, the display state transits to a my channel setting state S7-2. In the my channel setting state, channels to which a slide show of an image data group can be assigned and the assigned states of respective channels are displayed, and a focus used to select a channel to which a slide show is newly assigned is displayed.

FIG. 7 shows a state wherein 9ch, 10ch, 11ch, and 12ch are displayed as assignable channels, and an image data group of a given date has already been assigned to 9ch. No image data group is assigned to focused 10ch, and 11ch and 12ch. When the user presses the enter button 206 on the remote controller 200 while unassigned 10ch is focused, start of a slide show of an image data group of the focused folder is assigned to 10ch.

FIG. 8A shows a state of the channel selection table in which start of a slide show is assigned to 9ch.

The type column of 9ch stores "photo" information indicating that a slide show start setting is assigned, and stores as channel selection information as information that designates an image data group which is to undergo a slide show. When a new slide show start setting is made in 10ch according to the above description, the columns of the type and channel selection information that designates an image data group whose slide show is to start of 10ch store appropriate information as in 9ch, as shown in FIG. 8B.

Figure 9A:
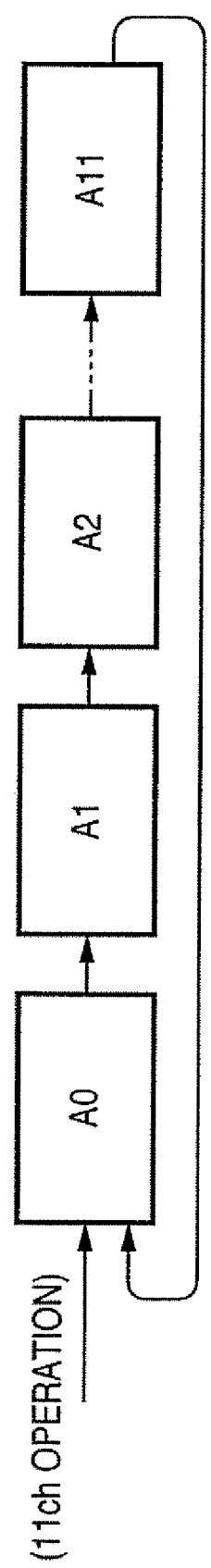
FIGS. 9A and 9B show screen display operations of a slide show which is launched by channel selection.

The controller 111 receives information indicating that the user has pressed the channel button 209 of 10ch upon broadcast viewing or viewing of arbitrary image data. Upon reception of this information, the controller 111 refers to the column of the channel selection table corresponding to 10ch, and when the type="photo", it starts a slide show according to the channel selection information. That is, the controller 111 automatically displays image data in the image data group designated by the channel selection information in turn in the single display state. FIG. 9A shows the slide show display operation launched by the channel button operation of 10ch. FIG. 9A shows that the single display state of 12 image data A0, A1, A2, . . . , A11 which belong to image data group A is switched in turn at predetermined time intervals (e.g., 5 sec), and image data A0 is displayed again after image data A11.

(Sequential Channel Selection of My Channel)

Figure 9B:
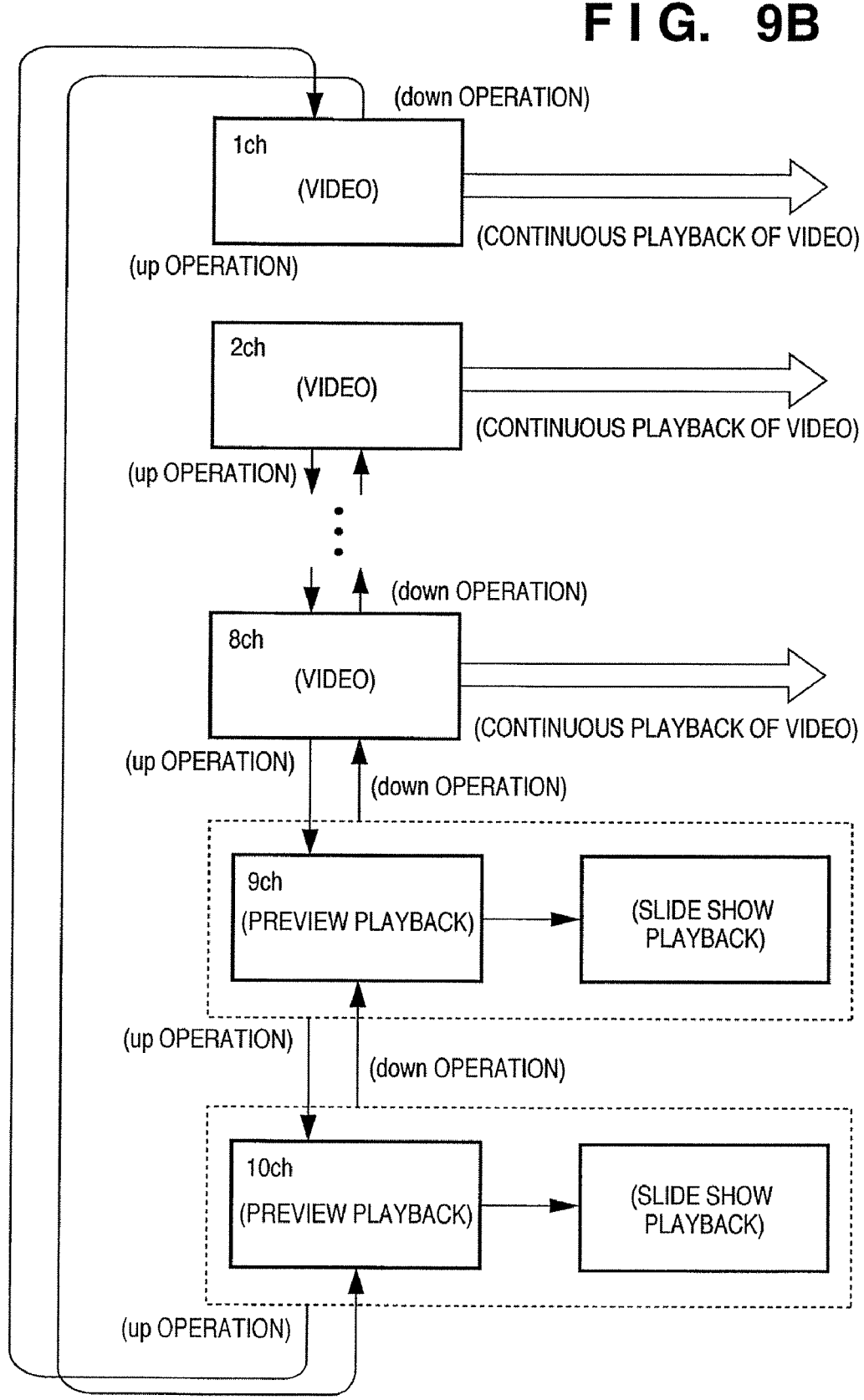

FIG. 9B illustrates the video or image display operation when the sequential channel selection is made while a slide show start setting is assigned to a specific channel button.

When the user presses the channel up button 210 on the remote controller 200 during viewing of a broadcast program, a channel is sequentially switched to the one which neighbors the currently viewed channel on the larger channel number side, as described above. When the type column of the channel selection table of the channel of interest is "TV", the controller 111 performs channel selection control according to the channel selection information in the channel selection information column of the channel selection table, and starts a video display of the received broadcast program. On the other hand, when the type column of the channel selection table of the channel switched by the sequential channel selection is "photo", the controller 111 makes a preview display of the image data group designated by the channel selection information of the channel selection table first, and then starts a slide show display. The preview display shows the full picture of the image data group, the slide show of which is to start.

FIGS. 10A and 10B are views for explaining the preview display method.

As shown in FIG. 10A, the image data group which is to undergo the preview display includes 12 image data A0 to A11. In the preview display method of this embodiment, image data sensed on a specific photographing date that specifies the group are arranged in ascending order of photographing time, and a time zone including these photographing times is equally divided into three zones. Image data having photographing times closest to start times Ta, Tb, and Tc of the respective zones, and image data having the latest photographing time Td are selected as representative images. In the preview display, these four representative images are displayed as a short-time slide show. That is, as shown in FIG. 10B, for example, image data A0, A5, A7, and A11 are sequentially switched and displayed at short time intervals (e.g., 1 sec).

As in the sequential channel selection upon broadcast viewing, when the sequential channel selection is made during display of the slide show assigned to the channel, the preview display of a slide show or the video display of a broadcast program of the next channel immediately starts. The same applies to a case wherein the preview display of a slide show is underway.

(Another Preview Display)

The preview display in the slide show is made for the purpose of allowing the user to recognize the contents of the slide show as a sequence of still images, which are relatively slowly switched, within a short period of time during the sequential operation selection. For this reason, still images need not be switched or the full picture of the image data group need not be presented. FIG. 11 shows another embodiment of the preview display. In FIG. 11, a still image obtained by compositing the four representative image data described in FIGS. 10A and 10B is displayed. As in the preview display shown in FIGS. 10A and 10B, image data which are selected from the group at equal time intervals are used to indicate the full picture of the image data group. However, these image data are composited to a still image, which is displayed for a short period of time (e.g. 3 sec).

Figure 12:
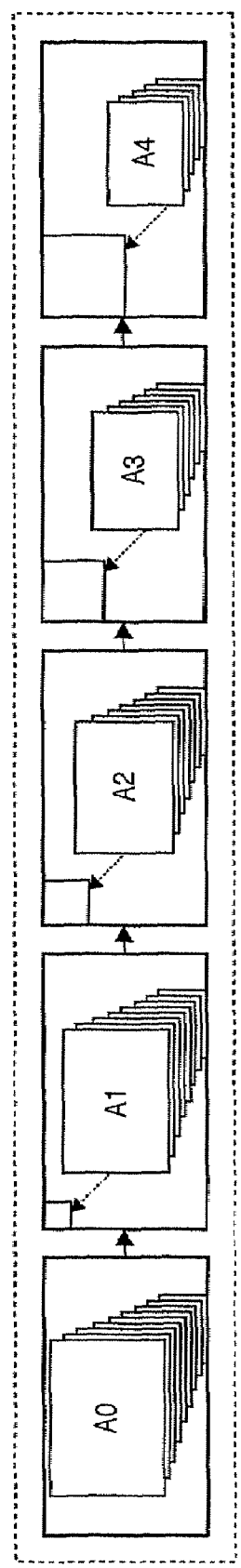
FIG. 12 is a view for explaining the preview playback operation upon displaying a slide show.

FIG. 12 shows still another embodiment of the preview display. In FIG. 12, first several images A0-A4 of the image data group are switched and displayed at short time intervals (e.g., 0.5 sec). Some first images are displayed in place of the full picture of the group to indicate that content includes many images, and to display a part of the contents for a short period of time (e.g., 2.5 sec).

(Example of Another Arrangement)

As described above, this embodiment has explained an application example in the digital TV which receives digital broadcast and, especially, BS digital broadcast. The broadcast to be received in the present invention is not limited to the digital broadcast, but may be analog broadcast, as a matter of course. That is, the present invention is effective for a television receiver having a function of assigning a slide show display that intermittently switches and displays still images to one of broadcast reception channels, and starting the slide show display by the selection operation of that channel.

The digital TV in this embodiment has the display unit as one of components. However, the present invention is not limited to this. For example, an arrangement which has a broadcast reception function and slide show display function, and makes a display on an externally connected display may be adopted, thus providing the same effects as in this embodiment.

(Description of Effects)

In the first embodiment, in the slide show in case of the sequential channel selection, representative images including a plurality of images having different photographing times are displayed from the image data group to be watched so that the full picture of the group can be visually confirmed within a short period of time.

In this way, even in the slide show launched by the sequential channel selection, the user can instantaneously understand the contents of the slide show which is about to start, and can determine if this channel is a target channel. More specifically, at the beginning of the slide show which mainly includes still images, the user can recognize the program contents with the same sense as broadcast programs displayed as videos. As a result, zapping can be naturally made while the slide shows and broadcast programs are mixed.

Second Embodiment

The second embodiment of the present invention will be described below.

In this embodiment, the present invention is applied to a digital TV having a function of recording and playing back a received broadcast content. Differences from the first embodiment will be mainly explained below. The same reference numerals denote the same components or those which make the same operations as in the first embodiment, and a repetitive description thereof will be avoided.

Figure 13:
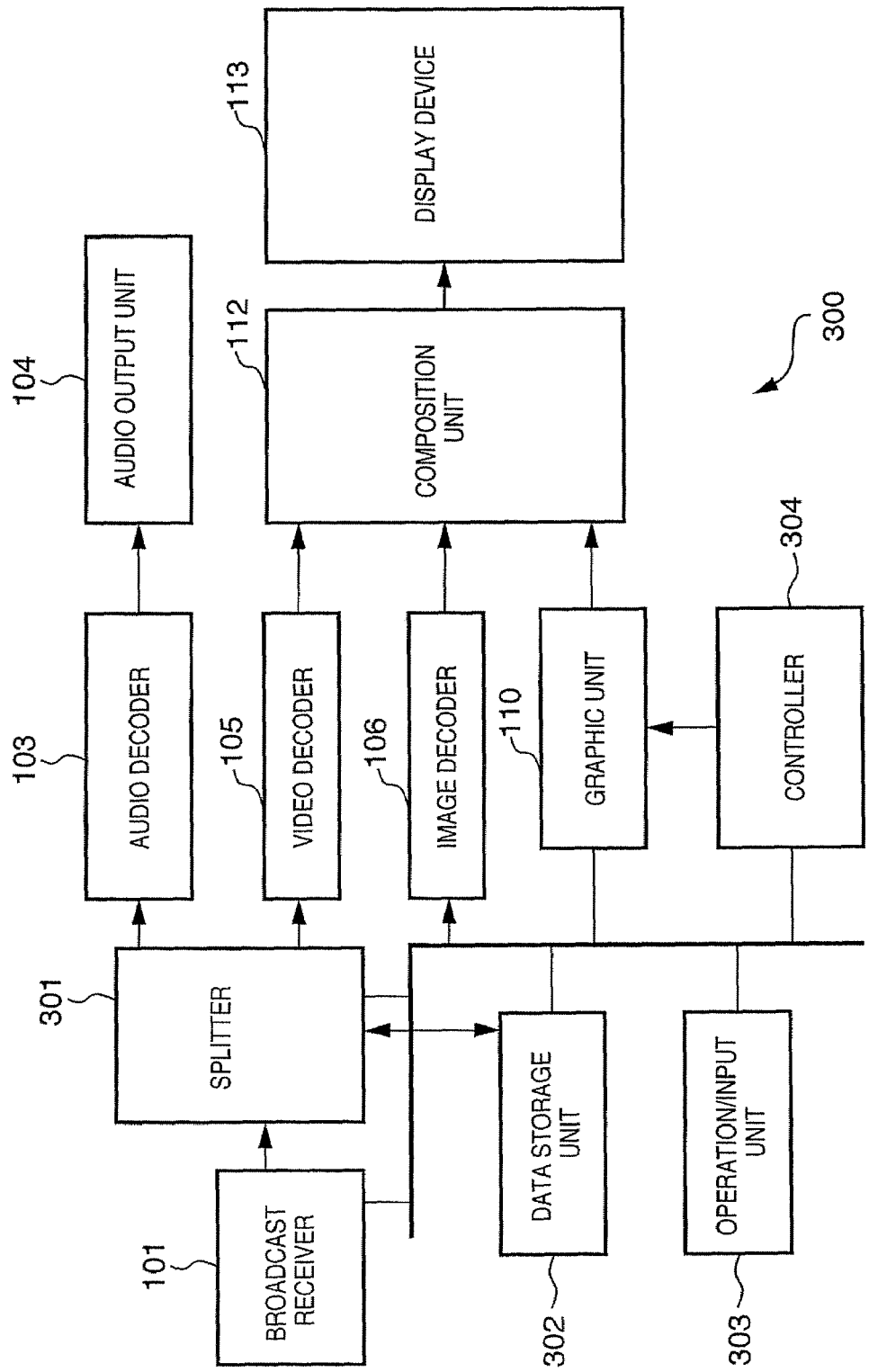
FIG. 13 is a block diagram showing the arrangement of a digital TV according to the second embodiment of the present invention.

FIG. 13 is a block diagram showing the arrangement of the digital TV according to the second embodiment of the present invention.

Referring to FIG. 13, reference numeral 301 denotes a splitter which extracts program sequence information from a TS signal output from the broadcast receiver 101, outputs it to a controller 304 (to be described later), and splits the TS signal into a target video signal, audio signal, and data broadcast data under the control of the controller 304. Furthermore, the splitter 301 attains video recording by inputting the TS signal to a data storage unit 302 comprising, e.g., a hard disk drive device. The splitter 301 receives the recorded TS signal which is played back and output from the data storage unit 302, and performs a similar split operation. Reference numeral 303 denotes an operation/input unit which has a function of receiving infrared ray signals from a remote controller 400 which is partially different from that in the first embodiment, or inputting user operations by means of operation switches directly provided to a digital TV 300, and sending them to the controller 304. The controller 304 systematically controls the respective units of the digital TV 300 based on user operation inputs received from the operation/input unit 303, and has a function of receiving digital broadcast, and allowing the user to view and recording a target broadcast program, and a function of playing back and allowing the user to view the recorded program content.

Figure 14:
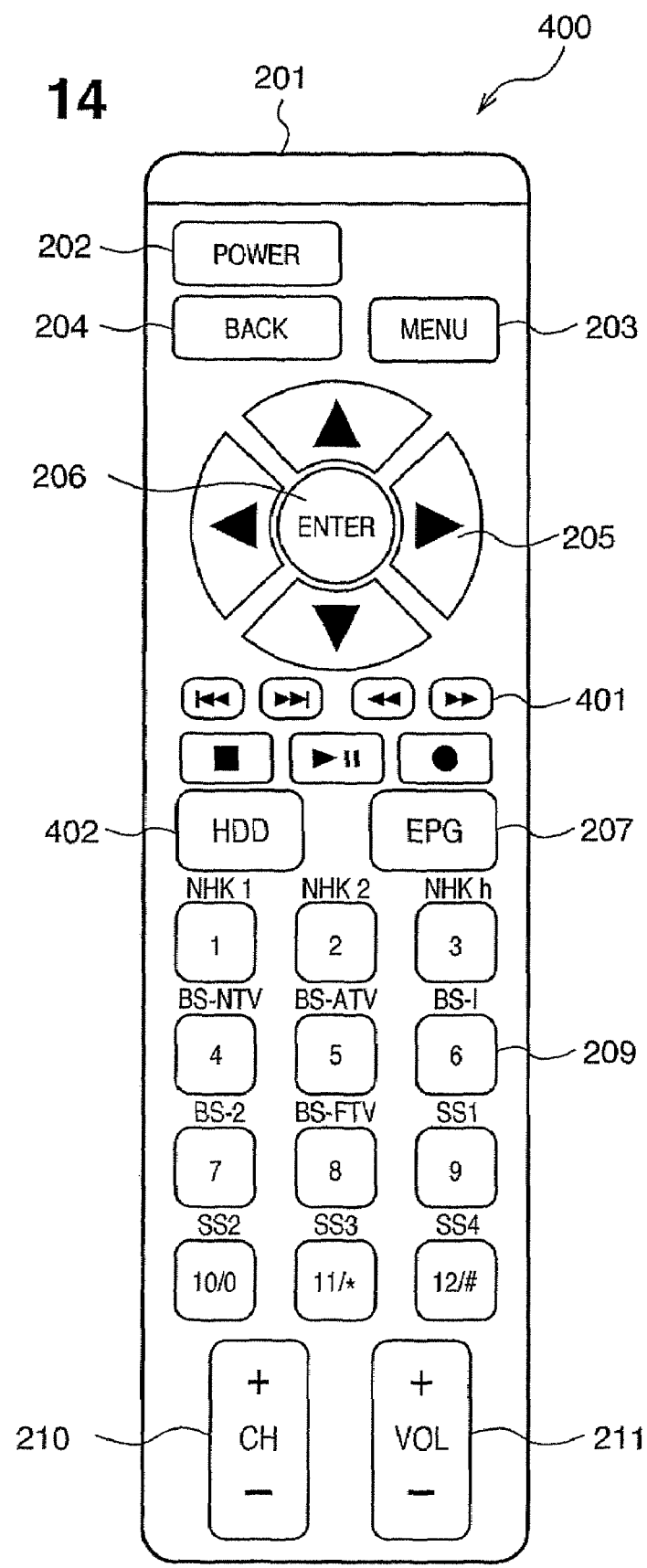
FIG. 14 shows an outer appearance of a remote controller of the second embodiment.

FIG. 14 shows the outer appearance of the remote controller 400 which transmits a user operation result to the operation/input unit 303 of the digital TV 300 as an infrared ray signal.

Reference numeral 402 denotes an HDD button used to launch the viewing operation of a recorded content; and 401, recording/playback operation buttons which include a button group used to instruct playback control of a recorded content to be watched and start of video recording of a broadcast program content which is being watched.

The user turns on/off the power switch of the digital TV 300, performs selection and viewing operations of broadcast programs including direct channel selection and sequential channel selection, and also performs recording and playback operations of broadcast programs by operating the operation buttons 401 equipped on the remote controller 400.

FIG. 15 illustrates the operation input and display states upon playing back and viewing the recorded content based on the received broadcast content recorded in the data storage unit 302.

Upon pressing of the HDD button 402 of the remote controller 400, the display state transits to a content list display state S15-1 that displays a list of recorded contents recorded in the data storage unit 302. Each recorded content is stored in the data storage unit 302 as a TS signal including at least video and audio data as the contents of that content. Also, information including the reception date and time of a program, reception channel, program name, and the like, and a representative image of the program based on the program sequence information included in the received TS signal are stored at the same time. In the content list display state S15-1, the representative image of a program, reception date and time, channel, and program name are displayed as a list for each recorded content. A frame indicating a focus is displayed on the displayed recorded contents to indicate a recorded content to be manipulated. The focus can be moved to the upper, lower, right, or left neighboring recorded content using the arrow buttons 205 on the remote controller 400. The user can select the recorded content to be played back and watched by moving the focus.

In the content list display state S15-1, playback of the focused recorded content starts upon pressing of the enter button 206. The display screen transits to a content playback display state S15-2, thus displaying a playback video of the content and also outputting a playback audio of that content from the audio output unit 104. In the content playback display state S15-2, the user can perform operations such as pause, play, FF, FR, and the like of the recorded content using a recording/playback operation buttons 401 on the remote controller 400.

In the content list display state S15-1, the display state transits to a menu display state S15-3 upon pressing of the menu button 203 on the remote controller 400 so that an operation for the focused recorded content can be selected. As shown in FIG. 15, in the menu display state S15-3, one of operations "my channel setting", and "play" and "delete" of a recorded content can be selected by moving the displayed focus.

Playback start of a specific recorded content can be set in one of the channel buttons 209 on the remote controller 400. When the user presses the enter button 206 on the remote controller 400 while focusing "my channel setting" in the menu display state S15-3, the display state transits to a my channel setting state S15-4. In the my channel setting state S15-4, channels to which a recorded content can be assigned and the assigned states of respective channels are displayed, and a focus used to select a channel to which playback of a recorded content is newly assigned is displayed.

The example shown in FIG. 15 shows a state wherein 9ch, 10ch, 11ch, and 12ch are displayed as assignable channels, and a given recorded content has already been assigned to 9ch. No recorded content is assigned to focused 10ch, and 11ch and 12ch. When the user presses the enter button 206 on the remote controller 400 while unassigned 10ch is focused, playback start of the focused recorded content is assigned to 10ch.

FIG. 16A shows a state of the channel selection table in which playback start of a recorded content is assigned to 9ch. The type column of 9ch stores "HDD" information indicating that playback start of the recorded content stored in the data storage unit 302 is assigned, and stores as channel selection information as information that designates a recorded content whose playback is to start. When playback start of a new recorded content is set in 10ch according to the above description, the columns of the type and channel selection information that designates a recorded content whose playback is to start of 10ch store appropriate information as in 9ch, as shown in FIG. 16B.

Figure 17A:
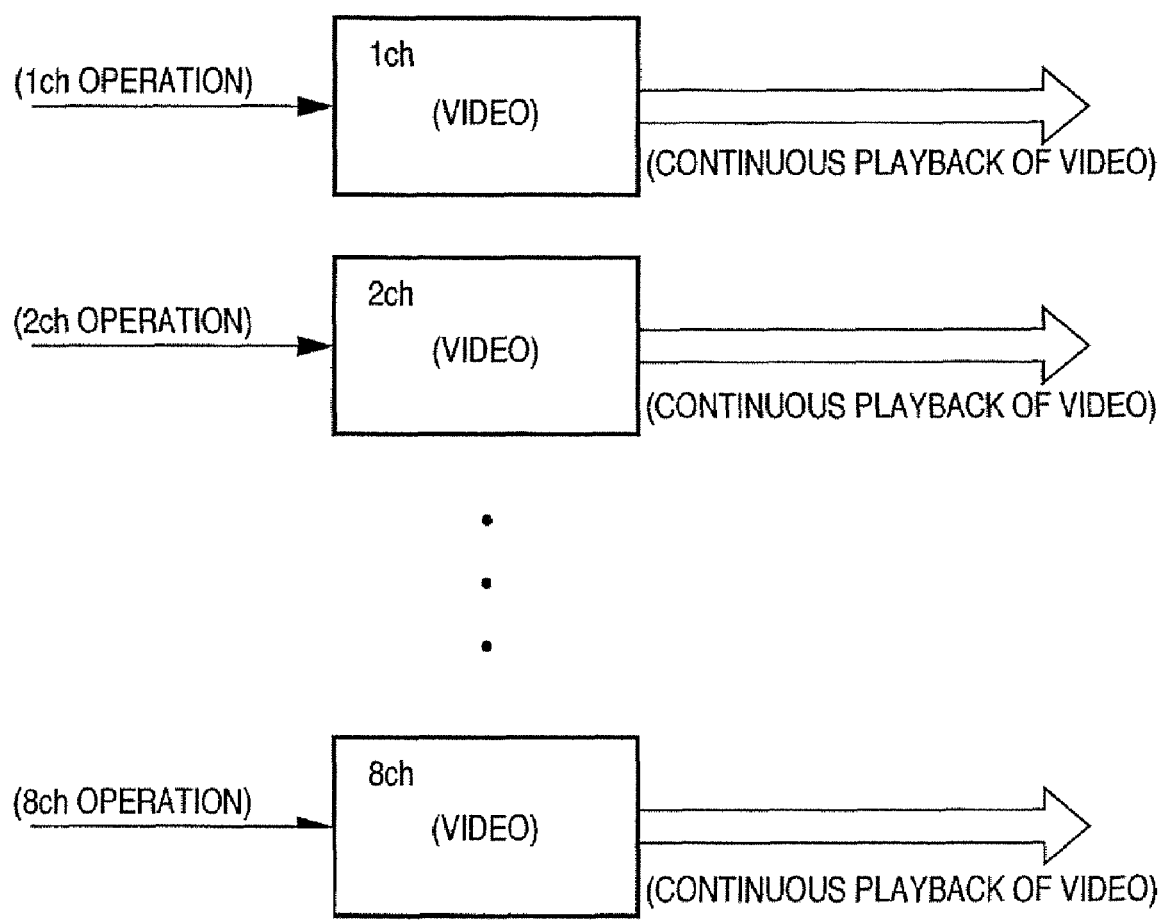

Upon receiving information indicating that the user has pressed one of the channel buttons 209 of 1ch to 8ch at the time of broadcast viewing or playback viewing of an arbitrary recorded content, the controller 304 performs channel selection control with reference to the column of the corresponding channel in the channel selection table. FIG. 17A illustrates the video display states in the direct channel selection, and indicates that a video display of a broadcast program of the designated channel starts.

Upon receiving information indicating that the user has pressed one of the channel button 209 of 10ch at the time of broadcast viewing or playback viewing of an arbitrary recorded content, the controller 304 refers to the column corresponding to 10ch of the channel selection table. When the type is "HDD", the controller 304 starts playback of a recorded content according to the channel selection information. That is, the controller 304 controls reading of the recorded content designated by the channel selection information from the data storage unit 302, splitting of the TS signal, and decoding and output of video and audio signals, thus displaying the recorded content in the same state as in the content playback display state S15-2. FIG. 17B illustrates the display operations of recorded content playback launched by operating the channel buttons 209 of 9ch and 10ch, and indicates that a video of the recorded content is continuously played back.

(Sequential Channel Selection of My Channel)

Figure 17C:
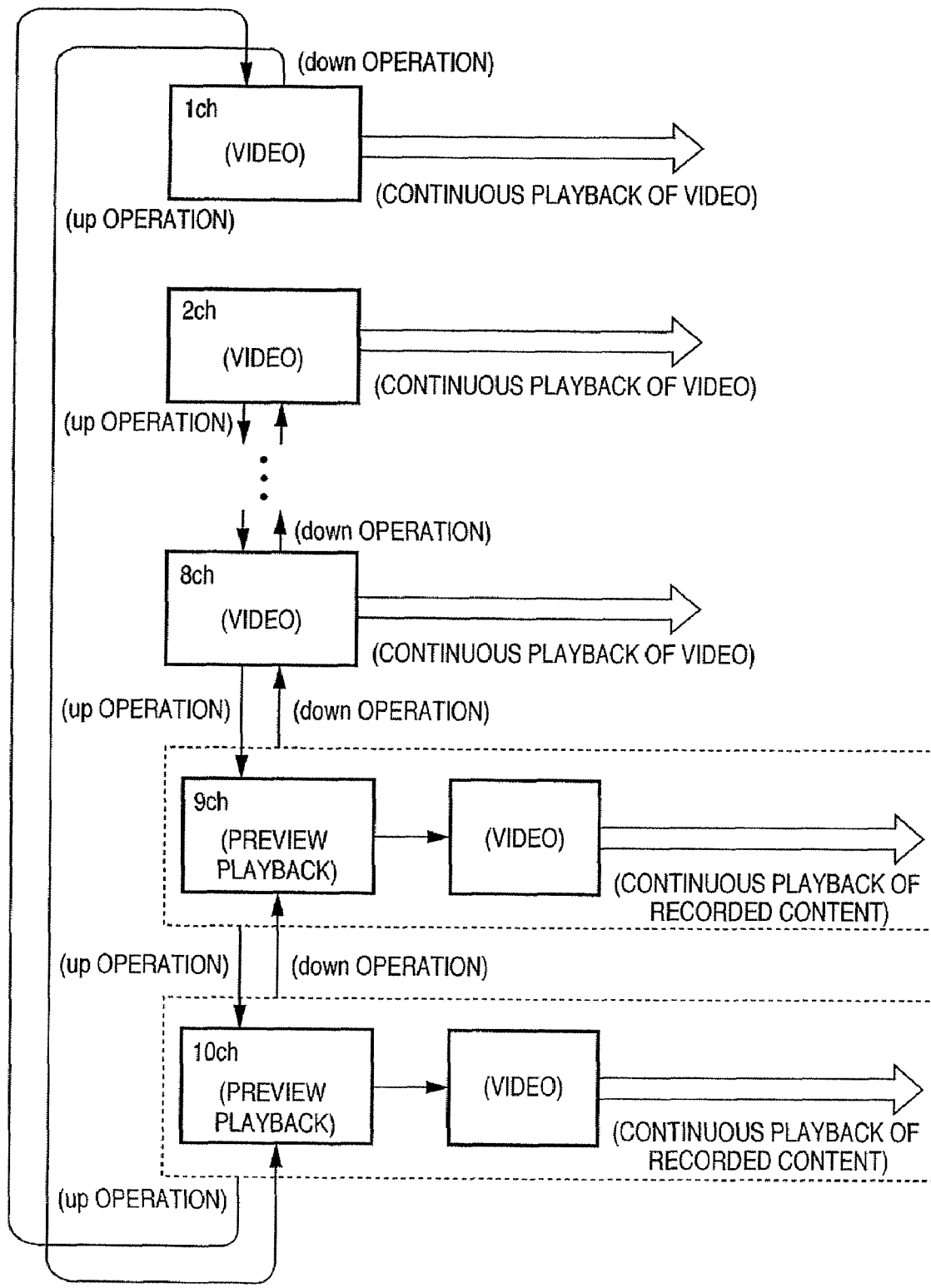

FIG. 17C illustrates the video display states when the sequential channel selection is made while a playback start of a recorded content is assigned to a specific channel button.

When the user presses the channel up button 210 on the remote controller 400 during viewing of a broadcast program, a channel is sequentially switched to the one which neighbors the currently viewed channel on the larger channel number side. When the type column of the channel selection table of the channel of interest is "TV", the controller 304 performs channel selection control according to the channel selection information in the channel selection information column of the channel selection table, and starts a video display of the received broadcast program. On the other hand, when the type column of the channel selection table of the channel switched by the sequential channel selection is "HDD", the controller 304 makes a preview playback of the recorded content designated by the channel selection information of the channel selection table first, and then starts a display of the playback video of the recorded content.

The preview playback of this embodiment displays a representative image of the recorded content which is also displayed in the content list display state S15-1. That is, the representative image of the recorded content as a still image is displayed for a short period of time (e.g., 2 sec) to directly indicate what recorded content will start from now, and a display of a playback video (moving image) of the recorded content starts.

(Another Preview Playback)

The preview playback may display a moving image extracted from the recorded content to be played back. A scene which represents the contents of the recorded content and can be understood within a short period of time can be used. Alternatively, a digest video of the recorded content may be generated and displayed by another technique.

(Example of Another Arrangement)

As described above, this embodiment has explained an application example in the digital TV which receives digital TV broadcast. The broadcast to be received in the present invention is not limited to the digital broadcast, but may be analog broadcast, as a matter of course. That is, the present invention is effective for a television receiver having a function of recording a received broadcast program content, assigning its playback launch operation to one of broadcast reception channels, and starting playback by the selection operation of that channel.

The digital TV in this embodiment has the display unit as one of components. However, the present invention is not limited to this. For example, an arrangement which has a broadcast reception function and recorded content playback function, and makes a display on an externally connected display may be adopted, thus providing the same effects as in this embodiment.

In this embodiment, the received broadcast program is recorded in the internal data storage unit. However, the gist of the present invention is not limited to this. For example, an external data storage device may be connected via communication means, and a broadcast program may be recorded and played back under the control of the controller. For example, an arrangement that uses an AV-HDD connected via an IEEE1394 interface technique may be used.

Furthermore, even in an arrangement which receives an already stored recorded content via a network including the Internet, and plays it back as a recorded content, the same effect can be provided. More specifically, the digital TV has a network interface function, a browser function of displaying a Web page received via the network, and a function of playing back a streaming content received via the network. Then, a video on-demand (VOD) service on the Internet is exploited. The user sets a viewing start operation of a streaming content by the VOD service in one of the channels, and can make a very easy viewing start operation of a streaming content which is repetitively done during a permitted viewing period.

(Description of Effects)

In the second embodiment, in case of the sequential channel selection, a plurality of images having different contents are displayed as representative images extracted from the content to be viewed so that the full picture of the content can be visually confirmed within a short period of time.

In this way, when viewing of a recorded content is started by the sequential channel selection, the contents of that content can be understood within a short period of time. Even when there are a plurality of channels that allow the user to view recorded contents, a channel selected by the sequential channel selection can be recognized. Therefore, zapping can be naturally made while the broadcast programs and recorded contents are mixed.

Other Embodiments

The preferred embodiments of the present invention have been explained using their practical examples, and the present invention can be practiced in the forms of a system, apparatus, method, program, storage medium (recording medium), and the like. More specifically, the present invention can be applied to either a system constituted by a plurality of devices, or an apparatus consisting of a single equipment.

The objects of the present invention can be achieved by implementing some of the functional blocks and operations shown in FIGS. 1 and 13 by either hardware circuits or software processing using a computer.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, a computer of the system or the like reads out and executes the program code.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as along as they have the program function.

As a recording medium (storage medium) for supplying the program, for example, a flexible disk, hard disk, optical disk, magneto-optical disk, and the like may be used. In addition, MO, CD-ROM, CD-R, CD-RW, magnetic tape, nonvolatile memory card, ROM, DVD (DVD-ROM, DVD-R), and the like may be used.

As another program supply method, connection can be established to a home page on the Internet using a browser on a client computer, and the computer program itself of the present invention can be downloaded from the home page. Also, the program can be supplied by a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by a computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2005-215980 filed on Jul. 26, 2005, which is hereby incorporated by reference herein in its entirety.

What is claimed is:

1. A television receiver which allows a user to view a video of a broadcast program and an image of image data stored in a storage device, comprising:
a first display control unit which displays the video of the broadcast program on a display unit when a first channel is selected;
a second display control unit which displays on said display unit a slide show that switches and displays image groups including a plurality of still image data stored in the storage device when a second channel is selected; and
an operation unit which executes at least two channel selection operations including a direct channel selection as an operation for directly selecting the first channel or the second channel by channel buttons respectively corresponding to the first and second channels, and a sequential channel selection as an operation for sequentially selecting the channels by up/down channel buttons,
wherein a display mode of the slide show by said second display control unit is determined based on whether said second channel is selected by direct channel selection or sequential channel selection; and
wherein the second display control unit starts to display the slide show in accordance with the direct channel selection when the second channel is directly selected by the operation unit, and to display the slide show in accordance with the sequential channel selection when the second channel is sequentially selected by the operation unit after a pre-view that displays a representative image selected among the image group including a plurality of still image data stored in the storage device based on a predetermined condition is displayed.

2. The television receiver according to claim 1, wherein the representative images are a plurality of still images selected among the image group including a plurality of still image data stored in the storage device based on the predetermined condition.

3. A display control method for a television receiver which allows a user to view a video of a broadcast program and an image of image data stored in a storage device, comprising:
a first display step of displaying the video of the broadcast program on a display unit upon selection of a first channel;
a second display step of displaying on said display unit a slide show that switches and displays image groups including a plurality of still image data stored in the storage device when a second channel is selected; and
an operation step of executing a channel selection operation as one of a direct channel selection as an operation for directly selecting the first channel or the second channel by channel buttons respectively corresponding to the first and second channels, and a sequential channel selection as an operation for sequentially selecting the channels by up/down channel buttons, wherein a display mode of the slide show in the second display step is determined based on whether said second channel is selected by direct channel selection or sequential channel selection, and
wherein in the second display step, display of the slide show starts in accordance with the direct channel selection when the second channel is directly selected in the operation step, and starts to display the slide show in accordance with the sequential channel selection when the second channel is sequentially selected in the operation step after a pre-view that displays a representative image selected among the image group including a plurality of still image data stored in the storage device based on a predetermined condition is displayed.

4. The method according to claim 3, wherein the representative images are a plurality of still images selected among the image group including a plurality of still image data stored in the storage device based on the predetermined condition.

5. A computer-readable recording medium, on which is stored a computer program for making a computer of a television receiver execute a display control method for a television receiver which allows a user to view a video of a broadcast program and an image of image data stored in a storage device, comprising:
a first display step of displaying the video of the broadcast program on a display unit upon selection of a first channel;
a second display step of displaying on the display unit a slide show that switches and displays image groups including a plurality of still image data stored in the storage device when a second channel is selected; and
an operation step of executing a channel selection operation as one of a direct channel selection as an operation for directly selecting the first channel or the second channel by channel buttons respectively corresponding to the first and second channels, and a sequential channel selection as an operation for sequentially selecting the channels by up/down channel buttons,
wherein a display mode of the slide show in the second display step is determined based on whether the second channel is selected by direct channel selection or sequential channel selection, and
wherein in the second display step, display of the slide show starts in accordance with the direct channel selection when the second channel is directly selected in the operation step, and starts to display the slide show in accordance with the sequential channel selection when the second channel is sequentially selected in the operation step after a pre-view that displays a representative image selected among the image group including a plurality of still image data stored in the storage device based on a predetermined condition is displayed.

* * * * *